US006461424B1

(12) United States Patent
Ramme et al.

(10) Patent No.: US 6,461,424 B1
(45) Date of Patent: Oct. 8, 2002

(54) ELECTRICALLY CONDUCTIVE CONCRETE AND CONTROLLED LOW-STRENGTH MATERIALS

(75) Inventors: Bruce W. Ramme, Okauchee; John J. Noegel, West Bend; Richard H. Setchell, Jr., Brookfield; Robert F. Bischke, Waukesha, all of WI (US)

(73) Assignee: Wisconsin Electric Power Company, Milwaukee, WI (US)

( * ) Notice: Subject to any disclaimer, the term of this patent is extended or adjusted under 35 U.S.C. 154(b) by 0 days.

(21) Appl. No.: 09/790,392

(22) Filed: Feb. 21, 2001

(51) Int. Cl.$^7$ ................................................ C04B 18/08
(52) U.S. Cl. .................... 106/709; 106/711; 106/DIG. 1
(58) Field of Search .................................. 106/709, 711, 106/DIG. 1

(56) References Cited

U.S. PATENT DOCUMENTS

| | | | |
|---|---|---|---|
| 3,573,427 A | 4/1971 | Louis et al. ................. 219/213 |
| 3,962,142 A | 6/1976 | Freeman et al. ............ 252/503 |
| 4,050,261 A | 9/1977 | Brewer et al. |
| 4,116,705 A | * 9/1978 | Chappell ............... 106/DIG. 1 |
| 4,210,457 A | * 7/1980 | Dodson et al. ........ 106/DIG. 1 |
| 4,230,568 A | 10/1980 | Chappell |
| 4,268,316 A | * 5/1981 | Wills, Jr. ............... 106/DIG. 1 |
| 4,374,672 A | 2/1983 | Funston et al. ................ 106/97 |
| 4,559,881 A | 12/1985 | Lankard et al. ................ 109/83 |
| 4,731,120 A | 3/1988 | Tuutti ........................... 106/97 |
| 4,786,388 A | 11/1988 | Tatum, Jr. ...................... 204/197 |
| 5,026,508 A | 6/1991 | Tatum, Jr. et al. .......... 252/502 |
| 5,080,773 A | 1/1992 | Tatum, Jr. et al. .......... 204/196 |
| 5,106,422 A | 4/1992 | Bennett et al. .............. 105/705 |
| 5,294,255 A | 3/1994 | Smetana et al. ............. 106/698 |
| 5,346,012 A | * 9/1994 | Heathman et al. .......... 166/293 |
| 5,346,547 A | 9/1994 | McCormack ................ 106/644 |
| 5,374,308 A | * 12/1994 | Kirkpatrick et al. ........ 106/709 |
| 5,447,564 A | 9/1995 | Xie et al. .................... 106/644 |
| 5,490,889 A | * 2/1996 | Kirkpatrick et al. ........ 106/709 |
| 5,520,730 A | * 5/1996 | Barbour ....................... 106/707 |
| 5,853,475 A | * 12/1998 | Liskowitz et al. .......... 106/705 |
| 5,908,584 A | 6/1999 | Bennett ....................... 252/502 |
| 5,951,751 A | 9/1999 | Williams et al. ............ 106/706 |

FOREIGN PATENT DOCUMENTS

EP 0 744 386 A1 11/1996

OTHER PUBLICATIONS

"Use of Flash in Concrete" Timms et al., Am Soc. Testing Mat'ls Proc (1956), 56, 1139–57, 1158–60 (discussion) abstract only.*

"Design & Properties of high volume flyash high performance concrete" Cabrera et al. Am Concrete Inst SP (1999) SP–186 (HP Concrete & Performance and Purity of Concrete Finders p21–37.*

"Weathering resistance of concretes containing flyash cements" Davis et al., J Am Concrete Inst (1941), 12, 281–93, Abstract Only.*

American Concrete Institute Committee 229, "Controlled Low–Strength Materials", ACI 229R–99, pp. 229R–1 to 229R–15, Jun. 1999.

American Society for Testing and Materials, "Standard Specification for Fly Ash and Raw or Calcined Natural Pozzolan for Use as a Mineral Admixture in Portland Cement Concrete", Designation: C 618–99, Jul. 1999.

Bruce W. Ramme et al., "Construction Experience with CLSM Fly Ash Slurry for Underground Facilities", American Concrete Institute Special Publication No. 153, Jun. 1995, pp. 1–11.

J.G. Cabrera et al., "Design and Properties of High–Volume Fly Ash High–Performance Concrete", American Concrete Institue, SP 186–2, p. 21–37, 1999.

A.G. Timms et al., "Use of Fly Ash in Concrete", American Society for Testing and Materials Proceedings, vol. 56, pp. 1139–1160, 1956.

R.E. Davis et al., "Weathering Resistance of Concretes Containing Fly–Ash Cements", Journal of the American Concrete Institute, vol. 12, pp. 281–293, 1941.

* cited by examiner

*Primary Examiner*—Paul Marcantoni
(74) *Attorney, Agent, or Firm*—Quarles & Brady LLP

(57) ABSTRACT

Compositions for producing electrically conductive controlled low-strength material and electrically conductive concrete are provided, comprising conventional components, but utilizing a non-standard, high carbon content, fly ash. One settable controlled low-strength material composition includes 1%–20% by weight of portland cement, 18%–85% by weight of fly ash having a carbon content of greater than 12%, and water such that the composition sets to a material having a compressive strength of 8.3 MPa or less. One settable concrete composition includes 1%–30% by weight of portland cement, 1%–20% by weight of fly ash having a carbon content of greater than 12%, 40%–90% by weight of an aggregate, and water such that the composition sets to a concrete having a compressive strength of at least 13.8 MPa.

30 Claims, No Drawings

ELECTRICALLY CONDUCTIVE CONCRETE AND CONTROLLED LOW-STRENGTH MATERIALS

CROSS REFERENCES TO RELATED APPLICATIONS

Not applicable.

STATEMENT REGARDING FEDERALLY SPONSORED RESEARCH

Not applicable.

BACKGROUND OF THE INVENTION

1. Technical Field

This invention relates to concrete and controlled low-strength materials having improved characteristics, reduced limestone content, and electrical conductivity such that when used in construction, the material is capable of conducting electrical charges such as those resulting from a lightning strike. Further, the concrete and controlled low-strength materials comprise a high carbon content fly ash, thus providing a means for utilization of a product usually considered a by-product, or a waste product, of coal burning power generation.

2. Background Information

It is widely known that fly ash can be incorporated into concrete as a pozzolanic constituent. For example, U.S. Pat. No. 4,268,316 teaches the preparation of a masonry cement comprising from about 10 to 25 percent fly ash, in combination with portland cement and kiln dust. The fly ash utilized in this patent comprises any of those fly ashes which meet the requirements of ASTM (American Society for Testing and Materials) C 618, "Standard Specification for Fly Ash and Raw or Calcined Natural Pozzolan for Use as a Mineral Admixture in Portland Cement Concrete." The patent goes on to postulate that fly ash may be utilized as a mineral admixture in masonry cement in place of natural pozzolans, siliceous or siliceous and aluminous materials which chemically react with calcium hydroxide to form compositions possessing cementitious properties.

It is also known that fly ash can be incorporated into controlled low-strength materials (often referred to as "CLSM"). In the publication "Controlled Low-Strength Materials", reported by American Concrete Institute Committee 229, June 1999, there is provided a description of controlled low-strength materials along with certain ingredient mixtures used to produce CLSM. Controlled low-strength materials are broadly defined in this publication as self-compacted, cementitious materials used primarily as a backfill in place of compacted fill. Conventional CLSM mixtures usually consist of water, portland cement, fly ash, and fine or coarse aggregates. Some CLSM mixtures consist of water, portland cement and fly ash. However, CLSM is not to be considered as a type of low-strength concrete. This publication also defines CLSM as a material that results in a compressive strength of 8.3 MPa (1200 psi) or less at the conventional 28 day testing period (typically without compaction), and notes that most current CLSM applications require unconfined compressive strengths of 2.1 MPa (300 psi) or less at the conventional 28 day testing period in order to allow future excavation. This publication makes reference to certain examples of CLSM mixtures which include fly ash. U.S. Pat. Nos. 5,951,751 and 4,374,672 also disclose the use of fly ashes which meet the requirements of ASTM C 618 in controlled low-strength materials. In U.S. Pat. No. 5,951,751, one composition includes 1–15% of a lime component, 10–45% of a pozzolanic material (which may be ASTM C 618 Fly Ash), 20–95% aggregate and 10–20% water by weight; and in U.S. Pat. No. 4,374,672, one composition includes 45–80% ASTM C 618 Fly Ash, 1–6% cement and 20–50% water by weight.

It is also known that fly ash is a voluminous by-product of coal burning electrical power generation plants, presenting a possible environmental disposal issue. While those fly ash varieties which meet the requirements of the ASTM Standard Specification C 618 for classes C and F are used as additives to concrete, those fly ash materials which have an excessively high carbon content may not be so used. Accordingly, much of this type of fly ash is relegated to land fill, a less than desirable solution from an environmental viewpoint.

Air dried concrete is considered a reasonably good electrical insulator, having a resistivity on the order of $10^6$ ohm-cm, with oven dried concrete having a resistivity on the order of $10^{11}$ ohm-cm. Moist concrete, on the other hand is an electrolyte having a resistivity on the order of $10^4$ ohm-cm, which leads to its classification as a semiconductor. Since the transmission of electrical charge in moist concrete occurs through the movement of dissolved ions in the electrolytic solution, higher cement content and higher water content result in lower resistivity. High water content, however, is not acceptable for structural concrete, since it also results in lowered compressive strength and density. It has been found that there is a direct relationship between the degree of hydration of the cement paste and resistivity, yielding a linear relationship between resistivity and compressive strength of cement paste and concrete. That is, resistivity increases as the compressive strength increases.

Electrically conductive concrete may be produced by placing electrically conductive fibers and/or particles in close contact with each other so that a conductive network may be formed throughout the concrete. In conductive concrete, the transmission of electrical charge occurs mainly through the conductive additives, rather than through the electrolytic solution created in moist concrete. Such additives as carbon fibers, steel fibers, steel shavings, and carbon black have been found to be effective in modifying the conductivity of concrete into which they are blended. For example, U.S. Pat. No. 3,962,142 teaches the use of calcined oil coke and acetylene black aggregates in conductive concrete having satisfactory mechanical strength, while U.S. Pat. No. 5,908,584 teaches a mixture of graphite, amorphous carbon, and sand, comprising 25 to 75% of a cementitious composite useful for conducting floors, heating elements, and ground connectors.

Electrically conductive concrete and controlled low-strength materials would be advantageous where lowered electrical resistance may be sought, such as for use in structures where it is necessary to protect electrical equipment from lightning strikes. Accordingly, a means to reduce the electrical resistance of concrete or controlled low-strength materials, or to increase the conductivity thereof, is of interest in the building industry, for example. Further, since high carbon content fly ash is readily available as a waste product, and carbon is known to be highly conductive, its use as an additive to concrete or controlled low-strength materials to lower electrical resistance has now been investigated.

SUMMARY OF THE INVENTION

The present invention provides a means to increase the conductivity of concrete by the addition of high carbon content fly ash. The addition of such amounts of high carbon content fly ash has been found to lower the electrical resistance of the product concrete without seriously adversely affecting the mechanical properties thereof. The present invention also provides a means to increase the conductivity of controlled low-strength materials, by the addition of high carbon content fly ash. The addition of such amounts of high carbon content fly ash has been found to lower the electrical resistance of the product controlled low-strength material, without seriously adversely effecting the mechanical properties thereof. Moreover, this method provides a means for the environmentally acceptable beneficial utilization of such fly ash, as well as providing a low cost construction material having properties suitable for use in such applications as would benefit from an electrically conductive concrete or controlled low-strength material, such as in grounding structures for protection against lightning strikes or random electrical discharge.

Thus, it is an advantage of the present invention to provide an inexpensive method for providing electrically conductive construction materials.

It is a further advantage to provide an economically advantageous means of beneficial utilization of a waste by-product.

It is another advantage to provide electrically conductive concrete that can be inexpensively manufactured, and to provide a dry concrete mixture that may be packaged for sale to the public for individual use by consumers wishing to provide an electrically conductive concrete structural element.

It is thus another advantage to provide a dry mix for a conductive concrete, which can be inexpensively packaged, delivered, mixed and utilized as desired.

These and other features, aspects, and advantages of the present invention will become better understood upon consideration of the following detailed description, and appended claims.

DETAILED DESCRIPTION OF THE INVENTION

It has been discovered that controlled low-strength materials and concrete can be made less electrically resistant by the addition of fly ash having a high carbon content. When using the term "carbon content in fly ash", the carbon content is as measured by loss on ignition. By the term "high carbon content", it is meant that the carbon content of the fly ash is greater than or equal to about 12% by weight. The carbon present in such fly ash provides an electrical pathway throughout the composition for conduction of electricity, without a severe deleterious effect upon mechanical properties, such as compressive strength, of the concrete or controlled low-strength material, thus permitting its use in construction.

Electrical properties of concrete are of concern in some applications where inadequate resistivity of concrete affects electrical signaling systems, such as railway ties, or in structures in which concrete is used for protection from stray currents. Electrical properties of concrete are also of interest in such applications as cathodic protection of reinforced concrete; electrical grounding; deicing of airport runways, and bridge decks, by electrical heating; and non-destructive testing of concrete. Conductive concrete or controlled low-strength materials have, in the past, been made by placing electrically conductive material throughout the material. Electrically conductive additives have included carbon fibers, steel fibers, steel shavings, carbon black, coke breeze, etc.

As is well known in the art, conventional concrete is a dense hard hydrated mass produced from mixtures of portland cement, coarse aggregate, fine aggregate, and water. Concrete mixtures generally use only sufficient water to make the mixture placeable and to yield hardened concrete having a compressive strength of at least 13.8 MPa (2000 psi.) after 28 days. Portland cement is a well known cement that upon mixing with water binds or unites the other materials present in the mixture into concrete. The portland cement is typically a Type I, II, III, IV and V portland cement. The coarse aggregate conventionally comprises particles that are greater than about 0.375 inches (9.5 millimeters) in size and may be gravel, granite, limestone, shale, and the like. The fine aggregate employed in portland cement concretes is most often sand (silica) comprised of particles less than about 0.375 inches (9.5 millimeters) in size, typically equal to or less than about 0.1875 inches (4.76 millimeters) in size.

A concrete in accordance with the present invention is formed from a composition including portland cement, aggregate, water, and a high carbon content fly ash that provides an electrical pathway throughout the concrete for conduction of electricity, without a severe deleterious effect upon mechanical properties, such as compressive strength, of the concrete. One example embodiment of the invention is a composition capable of setting to produce a concrete according to the present invention wherein the composition includes from about 1% to about 30% by weight of portland cement, from about 1% to about 20% by weight of fly ash having a carbon content as measured by loss on ignition of greater than 12%, from about 40% to about 90% by weight of an aggregate, and water in a sufficient amount such that the composition sets to a concrete having a compressive strength of at least 13.8 MPa (2000 psi.), where all weight percentages are percent by weight of the total composition. In one version of the invention, the composition sets to a concrete having an electrical resistivity of not more than about 130,000 ohm-centimeters. In another version of the invention, the composition sets to a concrete having an electrical resistivity of not more than about 30,000 ohm-centimeters. In yet another version of the invention, the composition sets to a concrete having an electrical resistivity of not more than about 11,000 ohm-centimeters. In still another version of the invention, the composition sets to a concrete having an electrical resistivity of not more than about 1500 ohm-centimeters.

A further embodiment of the invention is a composition capable of setting to produce a concrete according to the present invention wherein the composition includes from about 1% to about 30% by weight of portland cement, from about 1% to about 20% by weight of fly ash having an average carbon content as measured by loss on ignition of greater than 12%, from about 40% to about 90% by weight of aggregate, and from about 1% to about 20% by weight of water. Yet another embodiment of the invention is a composition capable of setting to produce a concrete according to the present invention wherein the composition includes from about 5% to about 15% by weight of portland cement, from about 1% to about 12% by weight of fly ash having an average carbon content as measured by loss on ignition of greater than 12%, from about 65% to about 85% by weight of aggregate, and from about 5% to about 15% by weight of water. Still another embodiment of the invention is a composition capable of setting to produce a concrete according to the present invention wherein the composition includes from about 5% to about 15% by weight of portland cement, from about 1% to about 12% by weight of fly ash having an average carbon content as measured by loss on ignition of greater than 12%, from about 20% to about 40% by weight of a fine aggregate having a particle size of 9.5 millimeters (0.375 inches) or less, from about 35% to about 55% by weight of a coarse aggregate having a particle size greater than 9.5 millimeters (0.375 inches), and from about 5% to about 15% by weight of water.

A composition capable of setting to produce a concrete according to the present invention may also include from about 1% to about 10% by weight of steel fibers. In one version of the composition, the weight ratio of fly ash to portland cement in the composition is about 0.5:1 to about 1:1. The composition may also include additional additives known in the art including, without limitation, kiln dust, silica fume, superplasticizer, dispersing agent, or reinforcing fibers. However, the composition according to the invention may consist essentially of from about 5% to about 15% by weight of portland cement, from about 1% to about 12% by weight of fly ash having an average carbon content as measured by loss on ignition of greater than 12%, from about 20% to about 40% by weight of sand, from about 35% to about 55% by weight of crushed stone, and from about 5% to about 15% by weight of water.

A controlled low-strength material in accordance with the invention shares properties with both soils and concrete. The CLSM is prepared from materials (i.e., portland cement, water, optionally coarse aggregate, and optionally fine aggregate) similar to the concrete described above but also exhibits properties of soils. The specific properties of the CLSM depend on the ingredients in the mixture. The flowability of CLSM distinguishes it from other fill materials. Because of the flowability of the CLSM, the CLSM is self-leveling and self-compacting, i.e. the CLSM does not need conventional placing and compacting equipment. One version of a composition according to the invention for producing a CLSM in accordance with the present invention results in a CLSM having a compressive strength of 8.3 MPa (1200 psi) or less at the conventional 28 day testing period, while another version of a composition according to the invention produces a CLSM in accordance with the present invention that has unconfined compressive strengths of 2.1 MPa (300 psi) or less at the conventional 28 day testing period in order to allow future excavation. One controlled low-strength material in accordance with the present invention is formed from a composition including portland cement, water, and a high carbon content fly ash that provides an electrical pathway throughout the controlled low-strength material for conduction of electricity, without a severe deleterious effect upon mechanical properties, such as compressive strength, of the controlled low-strength material. Another controlled low-strength material in accordance with the present invention is formed from a composition including portland cement, aggregate, water, and a high carbon content fly ash.

One example embodiment of the invention is a self-compacting, cementitious flowable fill composition capable of setting to produce a controlled low-strength material according to the present invention wherein the composition includes from about 1% to about 20% by weight of portland cement, from about 18% to about 85% by weight of fly ash having a carbon content as measured by loss on ignition of greater than 12%, and water in a sufficient amount such that the composition sets to a material having a compressive strength of 8.3 MPa (1200 psi.) or less, where all weight percentages are percent by weight of the total composition. Another example embodiment of the invention is a self-compacting, cementitious flowable fill composition capable of setting to produce a controlled low-strength material according to the present invention wherein the composition includes from about 1% to about 20% by weight of portland cement, from about 18% to about 85% by weight of fly ash having a carbon content as measured by loss on ignition of greater than 12%, from about 40% to about 90% by weight of an aggregate, and water in a sufficient amount such that the composition sets to a material having a compressive strength of 8.3 MPa (1200 psi.) or less, where all weight percentages are percent by weight of the total composition.

A further embodiment of the invention is a self-compacting, cementitious flowable fill composition capable of setting to produce a controlled low-strength material according to the present invention wherein the composition includes from about 1% to about 10% by weight of portland cement, from about 40% to about 65% by weight of fly ash having an average carbon content as measured by loss on ignition of greater than 12%, and from about 30% to about 50% by weight of water. Still another embodiment of the invention is a self-compacting, cementitious flowable fill composition capable of setting to produce a controlled low-strength material according to the present invention wherein the composition includes from about 1% to about 10% by weight of portland cement, from about 40% to about 75% by weight of an aggregate, from about 18% to about 35% by weight of fly ash having an average carbon content as measured by loss on ignition of greater than 12%, and from about 5% to about 35% by weight of water. Preferably, the aggregate used in the CLSM composition is selected from concrete sand, crushed limestone, and mixtures thereof. The CLSM composition may also include additional additives known in the art; however, the CLSM composition according to the invention may also consist essentially of the components described above. Preferably, the weight ratio of fly ash to portland cement in the CLSM composition is greater than 10:1. In one version of the invention, the composition sets to a controlled low-strength material having an electrical resistivity of not more than about 6000 ohm-centimeters. In another version of the invention, the composition sets to a controlled low-strength material having an electrical resistivity of not more than about 3500 ohm-centimeters. In yet another version of the invention, the composition sets to a controlled low-strength material having an electrical resistivity of not more than about 100 ohm-centimeters.

A conductive concrete or controlled low-strength material produced in accordance with the present invention has many applications. For example, in one application, conductive concrete or controlled low-strength materials can be used as a substitute for materials which are used to absorb and ground various types of energy for military and other government applications. These uses may include absorption of direct energy, energy feedback and amplification, and EMP pulses. The conductive concrete or controlled low-strength materials would replace or supplement traditionally used grounding materials and be connected by grounding loops. Due to the engineering properties of the conductive concrete or controlled low-strength materials, the absorption should cover the entire energy range of the electromagnetic spectrum.

A conductive concrete or controlled low-strength material produced in accordance with the invention also would be beneficial when used in structures that may be struck by lightning. Lightning research photographs indicate that the initial lightning energy dissipates in 15 to 60 meter channels longitudinally across the surface of the earth. This is in contrast to the perception that all energy conducts into a finite earth point. The image appears similar to multiple lava flow channels emanating from a single volcano cone. Present buried grid systems not only do not prevent these phenomena, but may in fact enhance the effect. It suggests that earth's inability to absorb large energy transfer at a finite point within the extremely short time event contributes to dangerous and damaging voltage scenarios. Extremely high voltage gradients result in physical structure and electronic equipment failures and indicate the need for an improved conduction transfer media to couple lightning energy to the earth. A conductive concrete or controlled low-strength material produced in accordance with the invention: (1) provides for low inductance, low resistance and subsequently low impedance values for all frequencies up to 1 Mhz; (2) conducts energy efficiently across and through its surface without damage while providing true equalized ground potential rise values; (3) conducts energy efficiently into the earth quickly and seamlessly by providing the lowest impedance-coupling path; (4) provides for long term, high strength physical properties; and (5) is compatible with copper, aluminum and galvanized steel products. Specific applications include: (1) microwave, radio, and cellular sites; (2) electrical power and substation plants; (3) electric distribution poles; and (4) high tech building systems.

Microwave, radio, and cellular site towers risk lightning strikes. Using a conductive concrete or controlled low-strength material produced in accordance with the invention in footings and large pads reduces ground potential rise by lowering the impedance between the lightning stroke and the earth. The event duration may also decrease due to shorter energy transfer times. A conductive concrete or controlled low-strength material produced in accordance with the invention could replace the typical wood, metal or standard concrete enclosure. Enhanced protection and reduced electronic equipment damage is achieved through the reduction of unacceptable voltage gradients. Using a conductive concrete or controlled low-strength material produced in accordance with the invention in the radial ground system will enhance energy transfer away from the site. The entire design package reduces risk to site failures thus improving revenue through reduced maintenance. A conductive concrete or controlled low-strength material produced in accordance with the invention will contribute to improved lightning protection efficiency at microwave, radio, TV, and cellular tower sites. Presently, the sites rely on copper wire grounding designs to lower earth resistivity to conduct lightning contacts to ground while providing an equalized ground potential rise within the protected site area. However, voltage gradients continue to exist resulting in equipment and revenue losses.

Electrical power and substation plants require above grade facilities grounded to large buried ground grid systems. This provides for efficient electrical operation of equipment and safe low step and touch ground potentials for operating personnel. Using a conductive concrete or controlled low-strength material produced in accordance with the invention to replace or enhance foundations and buried ground grid systems allows for integral above and below grade ground connections that are efficient, low maintenance, easy to test and resilient to damage. A conductive concrete or controlled low-strength material produced in accordance with the invention would provide high conductance paths for low and high frequency current transfers. Applications requiring low earth resistance values that are difficult to achieve are a particularly attractive solution to achieve satisfactory earth resistance values.

State regulations require electric distribution pole lines to be grounded periodically. While the primary purpose is system protection, stabilization, and elimination of stray voltage problems, surge protection devices connect to the same ground system. This results in a high impedance path for lightning and transient energy conduction. Surrounding the direct buried wood or metal pole base with a conductive concrete or controlled low-strength material produced in accordance with the invention increases fault and lightning protection by providing a low impedance conduction path to earth. In addition, increasing the large contact area between a conductive concrete or controlled low-strength material produced in accordance with the invention and earth enhances conductance, reduces wood pole rot at the earth line, and expedites installation.

The proliferation of "high tech" voice and data systems applications is requiring grounding performance evaluations in commercial facilities. Plastic utility service conduits to commercial and residential facilities remove traditional sources for attaching main ground systems. This increases the risk of communication equipment downtime and damage due to electrical system aberrations and lightning. National standards are directing building designer's attention to providing efficient local ground systems such as external or incorporated grounding rings to replace inefficient ground systems. A conductive concrete or controlled low-strength material produced in accordance with the invention will complement designer's options by allowing building steel components to couple directly to earth via a conductive structural medium. The transfer of lightning energy, stabilized equipotential ground system and presence of an efficient signal reference ground will contribute to high communication performance and reliability.

The invention is further illustrated in the following Examples which are presented for purposes of illustration and not of limitation.

EXAMPLES

Various compositions were utilized in the production of concrete and controlled low-strength materials in accordance with the present invention. The materials utilized included high carbon fly ash, cement, fine aggregate (e.g., clean sand), coarse aggregate (e.g., limestone aggregate or taconite pellets), steel fibers, and water. The materials were characterized for chemical and physical properties in accordance with the appropriate ASTM standards.

A clean concrete sand was used as the fine aggregate in the controlled low-strength materials and concretes prepared. The physical properties of the sand were determined per ASTM C 33 requirements: unit weight (ASTM C 29), specific gravity and absorption (ASTM C 128), fineness (ASTM C 136), material finer than #200 sieve (ASTM C 117), and organic impurities (ASTM C 40). A crushed quartzite limestone with a maximum size of ¾ inch was used as the coarse aggregate in the concrete materials prepared, and in only one of the controlled low-strength materials prepared. The physical properties of the limestone coarse aggregate were determined per ASTM C 33 requirements: unit weight (ASTM C 29), gradation (ASTM C 136), specific gravity and absorption (ASTM C 128), and material finer than #200 sieve (ASTM C 117). In one concrete mixture (Mixture Number 60), a heavy-weight coarse aggregate was used. The heavy-weight coarse aggregate comprised a processed taconite ore obtained from upper Michigan, USA. The physical properties of the taconite coarse aggregate were determined per ASTM C 33 requirements: unit weight (ASTM C 29), specific gravity and absorption (ASTM C 128), fineness (ASTM C 136), and material finer than #200 sieve (ASTM C 117).

As the cement used in the controlled low-strength materials and concretes prepared, Type 1 portland cement was used throughout the investigation. The chemical and physical properties of the cement were determined per applicable ASTM test methods. The cement was tested per ASTM C 150 requirements for air content (ASTM C 185), fineness (ASTM C 204), autoclave expansion (ASTM C 151), compressive strength (ASTM C 109), time of setting (ASTM C 191) and specific gravity (ASTM C 188).

As the fly ash used in the controlled low-strength materials and concretes prepared, a fly ash from the Port Washington, Wis. USA, electric power plant of Wisconsin Electric Power Co., having a high carbon content, was used. The fly ash was analyzed per ASTM C 618 specifications and produced the following chemical and physical analysis: Total Silica, Aluminum, Iron=80.97%; Sulfur Trioxide= 0.54%; Moisture Content=0.23%; Loss on Ignition=11.86%; Fineness Retained on #325 Sieve 18.32%; Strength Activity Index with Portland Cement, Ratio to Control @ 28 Days= 74.5%; Water Requirement, % of Control=102.5; Soundness, Autoclave Expansion=−0.012%; and Density= 2.22. It can be seen that the fly ash used in the Examples had a carbon content equal to about 12% by weight.

In one concrete mixture (Mixture Number 50), steel fibers were used to enhance electrical resistance. The steel fibers measured about 2 inches in length by ¼ inch wide, and are available under the trademark XOREX from Novocon of Mt. Prospect, Ill., USA.

Preparation of Concrete Mixtures

All concrete ingredients were manually weighed and loaded in a laboratory rotating-drum concrete mixer for mixing following the procedures of ASTM C 192. The resulting mixture was then discharged into a pan where the concrete was further tested and test specimens were cast.

Concrete Speciemen Preparation and Testing

Fresh concrete properties were also measured for the mixtures. Properties measured included: air content (ASTM C 237), slump (ASTM C 143), unit weight (ASTM C 138), and temperature (ASTM C 1064). Air temperature was also measured and recorded. Cylindrical test specimens 6-inch diameter×12 inches in length were prepared from each mixture for compressive strength (ASTM C 39) and density tests. All test specimens were cast in accordance with ASTM C 192. Concrete specimens were typically cured for one day in their molds at about 70±5° F. These specimens were then demolded and placed in a standard moist-curing room maintained at 100% R.H. and 73±3° F. temperature until the time of test (ASTM D 4832).

Preparation of CLSM Mixture

All CLSM ingredients were manually weighed and loaded in a rotating-drum concrete mixer. The CLSM ingredients were then mixed by the batch mixer. The required amount of the cement, together with one-half the specified quantity of fly ash, sand and coarse aggregate, was loaded into the mixer and mixed for three minutes. Three-quarters of the specified water was then added to the mixer and the CLSM was mixed for an additional three minutes. The remaining fly ash, sand, coarse aggregate, and water was added to the mixer and mixed for five more minutes. Additional water was added in the mixture as needed for achieving the desired flow, prior to discharging the CLSM for further testing. Whenever additional water was added to obtain the specified fresh CLSM characteristics, the CLSM mixture was mixed for an additional five minutes. The resulting mixture was then discharged into a pan where the CLSM was further tested and test specimens were cast.

CLSM Specimen Preparation and Testing

Fresh CLSM properties such as air content (ASTM D 6023), flow (ASTM D 6103), unit weight (ASTM D 6023), and setting and hardening (ASTM D 6024) were measured and recorded. Air temperature was also measured and recorded. CLSM test specimens were prepared from each mixture for compressive strength (ASTM D 4832) and density. All test specimens were cast in accordance with ASTM D 4832. Three CLSM test specimens were tested for each test reading. These specimens were typically cured for one day in their molds at about 70±5° F. The specimens were then demolded and placed in a standard moist-curing room maintained at 100% R.H. and 73±3° F. temperature until the time of test (ASTM D 4832).

Concrete and controlled low-strength materials were prepared as described above using the mixture proportions set forth in Table 1.

TABLE 1

| | CONCRETE | | | CLSM | | |
|---|---|---|---|---|---|---|
| MIXTURE NUMBER | 40 | 50 | 60 | 100 | 100s | 100sg |
| Fly Ash (lb./yd$^3$) (FA) | 265 | 260 | 265 | 1365 | 665 | 660 |
| Steel Fiber (lb./yd$^3$) | 0 | 105 | 0 | 0 | 0 | 0 |
| Cement (lb./yd$^3$) (C) | 355 | 350 | 350 | 100 | 65 | 45 |
| Fine Aggregate (lb./yd$^3$) (S) | 1285 | 1275 | 1265 | 0 | 1365 | 865 |
| Coarse Aggregate (lb./yd$^3$) (G) | 1510 | 1485 | 1980* | 0 | 0 | 1430 |
| Fly Ash Content wt. % [FA/(FA + C)] | 43 | 43 | 43 | 93 | 91 | 93.6 |
| Fly Ash Content wt. % [FA/(FA + C + S + G)] | 7.76 | 7.72 | 6.87 | 93 | 32 | 22 |
| Water (lb./yd$^3$) (W) | 390 | 395 | 420 | 1045 | 525 | 480 |
| Air Temperature ° F. | 80 | 78 | 78 | 78 | 79 | 78 |
| Mixture Temp. ° F. | 80 | 80 | 76 | 77 | 77 | 84 |
| Slump/Flow (inches) | 2 | 3¼ | 1¼ | 11¼ | 10¼ | 6¾ |
| Air content (%) | 1.5 | 1.0 | 4.1 | 1.7 | 1.2 | 0.9 |
| Unit Weight (lb./ft$^3$) | 140.2 | 142.4 | 158.6 | 92.8 | 95.7 | 129.2 |

*Taconite Pellets

Since the primary goal of the experimental work was to determine the feasibility of employing high carbon fly ash to decrease the electrical resistance of a concrete or a controlled low-strength material, the compositions were not optimized for structural properties, such as compressive strength. The compressive strength was measured, however, using standard cylinders 6 inches in diameter by 12 inches in length, following the procedures of ASTM C 39. The compressive strength of the concrete mixtures was from 2340 to 2535 psi at the age of 28 days. A typical concrete used in foundations and wall construction has a minimum specified 28 day compressive strength of 3000 to 4000 psi. The compressive strength of the controlled low-strength material mixtures was from 50 to 140 psi at the age of 28 days. This compressive strength range of the controlled low-strength material mixtures is excellent for a typical controlled low-strength material used for backfill or pavement bases where later excavation may be required. (It is noted that 50 psi in soil terms is 7200 psf and 100 psi is 14,400 psf which is comparable to well compacted soil/gravel.) It is believed that the compressive strength of concrete and controlled low-strength materials prepared with high carbon content fly ash, in accordance with this invention, may be increased by increasing the cementitious materials, and/or reducing the amount of water in the mixture. Further, the use of chemical admixtures such as a mid-range or high-range water reducing admixture (superplasticizer) may compensate in this area. In addition, the densities of the various compositions were determined, and as would be anticipated, are related to the amounts of dense materials (i.e., fine and coarse aggregate) present in the mixtures containing sand and gravel. These relationships, compressive strength and density, of the various tested materials, are set forth in Table 2. Relative to the values illustrating compressive strength and density, all values recited are the average of 3 measured values.

Electrical Resistance Measurements

With respect to the effect of the fly ash content on the electrical resistance of the concrete and controlled low-strength material compositions, resistance measurements were made on six identical cylinders made from each controlled low-strength material and concrete mixture, three air dried and three water saturated. Resistance measurements were taken using a Leader LCR-475-01 multimeter at seven pre-determined locations on all six cylinders for each mixture. For each of the seven locations, an average was determined for each type of test cylinder. The average result of each specimen at each location was recorded. The seven locations used for measuring electrical resistance were:

Location 1: Resistance was measured along the 12-inch length of the cylinder through a 9-inch diameter copper plate on both ends of the cylinder.

Locations 2—4: Resistance measurements were taken along the 12-inch length of the cylinder, using a 0.5-inch diameter copper plate on both ends of the cylinder. The specific locations were: Location 2—at the center; Location 3—half way between center and surface/edge; and Location 4—near the surface/edge.

Locations 5–6: Measurements were taken using the 0.5-inch diameter copper plates to determine characteristics of surface electrical resistance between two locations about 4 inches apart on the surface/edge of the cylinder (Location 5) and about 8 inches apart on the surface/edge of the cylinder (Location 6). In each instance, the measurement points were in the same lengthwise plane of the cylinder.

Location 7: Measurement was made across the diameter of the cylinder at approximately the mid-point of the cylinder.

The resistance measurements taken at the seven pre-determined locations were converted into resistivity values (ohm-cm) and averaged. The resistivity values of the concrete and controlled low-strength material compositions from location 1 are set forth in Table 2.

Reactance Measurement and Calculation of Permeability

Reactance of the test cylinders was measured by placing each cylinder in a copper wire coil, and measuring the reactance of the coil with air in the core, as opposed to when the cylinder is present as the core. The reactance values of the coil with an air core and a test cylinder core were measured with a Leader LCR-475-01 multimeter. The reactance values were then used to calculate the permeability values, from the relationship:

$$\frac{\mu_0}{\mu_1} = \frac{L_1}{L_2} \Rightarrow \mu_1 = \frac{\mu_0 L_2}{L_1}$$

wherein:

$L_1$=Reactance of the coil with air core $L_2$=Reactance of the coil with the test cylinder as the core $\mu_0$=Permeability of air ($4\pi \times 10^{-7}$ Henry/meter)

$\mu_1$=Permeability of the cylinder.

The permeability of the various mixtures was calculated, and relative permeabilities, i.e. the ratio of permeability of the sample to the permeability of air, are set forth in Table 2.

TABLE 2

| | CONCRETE | | | CLSM | | |
|---|---|---|---|---|---|---|
| MIXTURE NUMBER | 40 | 50 | 60 | 100 | 100s | 100sg |
| Fly Ash Content wt. % [FA/(FA + C)] | 43 | 43 | 43 | 93 | 91 | 93.6 |
| Fly Ash Content wt. % [FA/(FA + C + S + G)] | 7.76 | 7.72 | 6.87 | 93 | 32 | 22 |
| Compressive Strength (psi) | | | | | | |
| 3 Day | 1025 | 970 | 830 | 15 | 30 | 20 |
| 7 Day | 1455 | 1380 | 1370 | 35 | 100 | 110 |
| 14 Day | 1810 | 1850 | 1760 | 60 | 120 | 110 |
| 28 Day | 2535 | 2385 | 2340 | 50 | 140 | 130 |
| Density (lb./ft$^3$) 3 Day | 140.4 | 143.1 | 159.7 | — | 120.8 | 133.1 |
| 7 Day | 140.7 | 146.7 | 160.2 | 94.0 | 122.5 | 134.4 |
| 14 Day | 140.1 | 144.4 | 160.1 | 93.9 | 122.5 | 134.8 |

TABLE 2-continued

| | CONCRETE | | | CLSM | | |
|---|---|---|---|---|---|---|
| MIXTURE NUMBER | 40 | 50 | 60 | 100 | 100s | 100sg |
| 28 Day | 141.7 | 142.8 | 160.5 | 93.9 | 122.1 | 132.4 |
| Resistivity - Air dried | | | | | | |
| (ohm-cm) | | | | | | |
| 3 Day | 4588.5 | 1715.8 | 3152.2 | 40.1 | 65.8 | 151.4 |
| 7 Day | 7955.5 | 3590.8 | 4628.0 | 225.6 | 309.4 | 863.6 |
| 14 Day | 14263 | 6403.7 | 9974.8 | 837.9 | 911.5 | 1430.4 |
| 21 Day | — | — | — | 1891.2 | — | — |
| 28 Day | 27330 | 10672 | 127674 | 3890.1 | 3417.9 | 5824.9 |
| Resistivity - Saturated | | | | | | |
| (ohm-cm) | | | | | | |
| 3 Day | 1376.5 | 997.7 | 1336.4 | 40.1 | 65.8 | 151.4 |
| 7 Day | 1875.0 | 1017.4 | 1376.5 | 40.1 | 85.6 | 161.6 |
| 14 Day | 2793.1 | 1156.8 | 1416.6 | 40.1 | 103.5 | 168.8 |
| 21 Day | — | — | — | 44.3 | — | — |
| 28 Day | 4069.6 | 1486.0 | 1695.5 | 48.5 | 101.7 | 183.7 |
| Relative Permeability | | | | | | |
| Air Dried | | | | | | |
| 3 Day | 1.004 | 1.082 | 1.048 | 1.001 | 1.004 | 1.006 |
| 7 Day | 1.004 | 1.082 | 1.048 | 1.001 | 1.004 | 1.006 |
| 14 Day | 1.004 | 1.082 | 1.048 | 1.004 | 1.004 | 1.006 |
| 28 Day | 1.004 | 1.082 | 1.048 | 1.012 | 1.004 | 1.006 |
| Relative Permeability | | | | | | |
| Saturated | | | | | | |
| 3 Day | 1.006 | 1.089 | 1.051 | 1.001 | 1.004 | 0.999 |
| 7 Day | 1.006 | 1.089 | 1.051 | 0.999 | 1.004 | 1.008 |
| 14 Day | 1.006 | 1.089 | 1.051 | 1.001 | 1.004 | 1.005 |
| 28 Day | 1.005 | 1.089 | 1.051 | 1.012 | 1.004 | 1.006 |

Looking at Table 2, it can be seen that the electrical resistivity of the air dried concrete prepared in accordance with the invention is in the range of $1-128 \times 10^3$ ohm-cm. As detailed above in the "Background of the Invention" section, air dried concrete typically has a resistivity of the order of $10^6$ ohm-cm, with oven dried concrete having a resistivity of the order of $10^{11}$ ohm-cm. Therefore, it is apparent that the electrical resistivity of concrete prepared in accordance with the invention is less than the electrical resistivity of conventional concrete. In other words, by incorporating high carbon fly ash into a concrete mixture as in the present invention, a more electrically conductive concrete is produced. It can also be seen that the use of steel fibers in the concrete mixture along with the high carbon fly ash yielded an even lower resistivity. From Table 2, one may also see that the permeability of a concrete prepared with high carbon fly ash in accordance with the present invention exceeds that of air, indicating a greater capability to carry an electrical current. One also observes that the compressive strength and density of such concretes are such that optimization thereof will provide structural concretes with lowered electrical resistivity, i.e., increased electrical conductivity.

Looking again at Table 2, it can be seen that as the percent of high carbon fly ash content in the controlled low-strength material mixtures increases, the resistivity of the resulting controlled low-strength material decreases. It appears that the most significant decrease in resistivity occurs when increasing the high carbon fly ash content in the controlled low-strength materials mixture from 22% to 32%. This is evident in the high carbon fly ash controlled low-strength material mixtures for both the saturated and air dry specimens.

It can be appreciated that the fly ash used in the Examples had a carbon content equal to about 12% by weight. The use of fly ash having even greater levels of carbon would further decrease the resistivity of the resulting controlled low-strength material and concrete. In addition, an increased concentration of high carbon fly ash in the composition that forms the concrete or CLSM will result in increased conductivity. In practice, the intended use of the material will also be important. For example, if high strength is an important design requirement, the mixture will need to be proportioned as a concrete with appropriate fine aggregate, coarse aggregate and cement which will decrease the amount of high carbon fly ash used in the mixture. However, if the intended use is as a trench backfill or parking lot base material where lower strengths are acceptable and desirable, the mixture can be proportioned with very high concentrations of high carbon fly ash yielding greater electrical conductivity.

Although the present invention has been described in considerable detail with reference to certain embodiments, one skilled in the art will appreciate that the present invention can be practiced by other than the described embodiments, which have been presented for purposes of illustration and not of limitation. For example, the above examples have used one source of high carbon fly ash with a specific high carbon content. However, other sources of high carbon fly ash with various high carbon contents can be used with the invention. The carbon content and the other properties of the fly ash will affect the proportions used to manufacture controlled low-strength materials or concrete to obtain desired electrical properties as well as other project performance requirements (strength, durability, etc.). Therefore, the scope of the appended claims should not be limited to the description of the embodiments contained herein.

INDUSTRIAL APPLICABILITY

Concrete and controlled low-strength structural materials may be provided with lowered electrical resistance, for use in applications where the capability to carry an electrical charge is advantageous, such as in building structures subject to lightning strike. These concretes and controlled low strength materials are prepared using standard admixture components, plus a high carbon content fly ash component to lower the resistance. Such high carbon fly ash materials may be obtained, as a waste product, from such sources as coal fired electric power generation.

What is claimed is:

1. A self-compacting, cementitious flowable fill composition comprising:
    from about 1% to about 20% by weight of portland cement;
    from about 18% to about 85% by weight of fly ash having a carbon content as measured by loss on ignition of greater than 12%; and
    water in a sufficient amount such that the composition sets to a material having a compressive strength of 8.3 MPa or less,
    wherein all weight percentages are percent by weight of the total composition.

2. The composition of claim 1 wherein:
    the composition sets to a material having a compressive strength of 2.1 MPa or less.

3. The composition of claim 1 wherein:
    the composition further includes from about 40% to about 90% by weight of an aggregate selected from the group consisting of sand, crushed limestone, and mixtures thereof.

4. The composition of claim 3 wherein:
    the aggregate is a mixture of sand and crushed limestone.

5. The composition of claim 1 wherein:
    the composition sets to a material having an electrical resistivity of not more than about 6000 ohm-centimeters.

6. The composition of claim 1 wherein:
    the composition sets to a material having an electrical resistivity of not more than about 3500 ohm-centimeters.

7. The composition of claim 1 wherein:
    the composition sets to a material having an electrical resistivity of not more than about 100 ohm-centimeters.

8. The composition of claim 1 wherein:
    the composition consists essentially of
        from about 1% to about 20% by weight of portland cement;
        from about 18% to about 85% by weight of fly ash having an average carbon content as measured by loss on ignition of greater than 12%; and
        from about 5% to about 50% by weight of water.

9. The composition of claim 1 wherein:
    the composition consists essentially of
        from about 1% to about 20% by weight of portland cement;
        from about 40% to about 90% by weight of an aggregate;
        from about 18% to about 85% by weight of fly ash having an average carbon content as measured by loss on ignition of greater than 12%; and
        from about 5% to about 50% by weight of water.

10. The composition of claim 1 wherein:
    the composition comprises
        from about 1% to about 10% by weight of portland cement;
        from about 40% to about 65% by weight of fly ash having an average carbon content as measured by loss on ignition of greater than 12%; and
        from about 30% to about 50% by weight of water.

11. The composition of claim 1 wherein:
    the composition comprises
        from about 1% to about 10% by weight of portland cement;
        from about 40% to about 75% by weight of an aggregate;
        from about 18% to about 35% by weight of fly ash having an average carbon content as measured by loss on ignition of greater than 12%; and
        from about 5% to about 35% by weight of water.

12. The composition of claim 1 wherein:
    the weight ratio of fly ash to portland cement in the composition is greater than 10:1.

13. A composition that sets to produce a concrete, the composition comprising:
    from about 1% to about 30% by weight of portland cement;
    from about 1% to about 20% by weight of fly ash having a carbon content as measured by loss on ignition of greater than 12%;
    from about 40% to about 90% by weight of an aggregate selected from the group consisting of sand, crushed stone, taconite pellets, and mixtures thereof; and
    water in a sufficient amount such that the composition sets to a concrete having a compressive strength of at least 13.8 MPa,
    wherein the weight ratio of fly ash to portland cement in the composition is about 0.5:1 to about 0.8:1, and
    wherein all weight percentages are percent by weight of the total composition.

14. The composition of claim 13 wherein:
    the composition sets to a concrete having an electrical resistivity of not more than about 30,000 ohm-centimeters.

15. The composition of claim 13 wherein:
    he composition sets to a concrete having an electrical resistivity of not more than about 11,000 ohm-centimeters.

16. The composition of claim 13 wherein:
    the composition sets to a concrete having an electrical resistivity of not more than about 1,500 ohm-centimeters.

17. The composition of claim 13 comprising:
    from about 1% to about 30% b weight of portland cement;
    from about 1% to about 20% by weight of fly ash having an average carbon content as measured by loss on ignition of greater than 12%;
    from about 40% to about 90% by weight of aggregate; and
    from about 1% to about 20% by weight of water.

18. The composition of claim 13 comprising:
    from about 5% to about 15% by weight of portland cement;
    from about 1% to about 12% by weight of fly ash having an average carbon content as measured by loss on ignition of greater than 12%;
    from about 65% to about 85% by weight of aggregate; and
    from about 5% to about 15% by weight of water.

19. The composition of claim 13 comprising:
    from about 5% to about 15% by weight of portland cement;
    from about 1% to about 12% by weight of fly ash having an average carbon content as measured by loss on ignition of greater than 12%;

from about 20% to about 40% by weight of a fine aggregate having a particle size of 9.5 millimeters or less;

from about 35% to about 55% by weight of a coarse aggregate having a particle size greater than 9.5 millimeters; and from about 5% to about 15% by weight of water.

20. The composition of claim 19 further comprising:

from about 1% to about 10% by weight of steel fibers.

21. The composition of claim 20 wherein:

the composition sets to a concrete having an electrical resistivity of not more than about 2,000 ohm-centimeters.

22. The composition of claim 20 wherein:

the composition sets to a concrete having an electrical resistivity of not more than about 130,000 ohm-centimeters.

23. The composition of claim 13 wherein:

the composition consists essentially of from about 5% to about 15% by weight of portland cement;

from about 1% to about 12% by weight of fly ash having an average carbon content as measured by loss on ignition of greater than 12%;

from about 20% to about 40% by weight of sand;

from about 35% to about 55% by weight of crushed stone; and from about 5% to about 15% by weight of water.

24. A composition that sets to produce a concrete, the composition comprising:

from about 1% to about 30% by weight of portland cement;

from about 1% to about 20% by weight of fly ash having a carbon content as measured by loss on ignition of greater than 12%;

from about 1% to about 10% by weight of steel fibers;

from about 40% to about 90% by weight of an aggregate selected from the group consisting of sand, crushed stone, taconite pellets, and mixtures thereof; and water in a sufficient amount such that the composition sets to a concrete having a compressive strength of at least 13.8 MPa, wherein all weight percentages are percent by weight of the total composition.

25. The composition of claim 24 wherein:

the composition sets to a concrete having an electrical resistivity of not more than about 2,000 ohm-centimeters.

26. The composition of claim 24 wherein:

the composition sets to a concrete having an electrical resistivity of not more than about 11,000 ohm-centimeters.

27. The composition of claim 24 wherein:

the composition sets to a concrete having an electrical resistivity of not more than about 30,000 ohm-centimeters.

28. The composition of claim 24 wherein:

the composition sets to a concrete having an electrical resistivity of not more than about 130,000 ohm-centimeters.

29. The composition of claim 24 wherein:

the weight ratio of fly ash to portland cement in the composition is about 0.5:1 to about 1:1.

30. The composition of claim 24 wherein:

the composition consists essentially of from about 5% to about 15% by weight of portland cement;

from about 1% to about 12% by weight of fly ash having an average carbon content as measured by loss on ignition of greater than 12%;

from about 1% to about 10% by weight of steel fibers;

from about 20% to about 40% by weight of sand;

from about 35% to about 55% by weight of crushed stone; and from about 5% to about 15% by weight of water.

* * * * *

UNITED STATES PATENT AND TRADEMARK OFFICE
CERTIFICATE OF CORRECTION

PATENT NO.    : 6,461,424 B1                                    Page 1 of 1
DATED         : October 8, 2002
INVENTOR(S)   : Ramme et al.

It is certified that error appears in the above-identified patent and that said Letters Patent is hereby corrected as shown below:

<u>Column 9,</u>
Line 35, "Speciemen" should read -- Specimen --.

<u>Column 16,</u>
Line 38, "he" should read -- the --.
Line 46, "b" should read -- by --.

Signed and Sealed this

Twenty-fifth Day of February, 2003

JAMES E. ROGAN
*Director of the United States Patent and Trademark Office*